(12) United States Patent
Imai et al.

(10) Patent No.: US 12,331,864 B2
(45) Date of Patent: Jun. 17, 2025

(54) JOINT STRUCTURE, JOINT UNIT AND ASSEMBLY METHOD OF JOINT UNIT

(71) Applicant: Surpass Industry Co., Ltd., Saitama (JP)

(72) Inventors: Hiroshi Imai, Saitama (JP); Kazuki Hirai, Saitama (JP)

(73) Assignee: Surpass Industry Co., Ltd., Saitama (JP)

( * ) Notice: Subject to any disclaimer, the term of this patent is extended or adjusted under 35 U.S.C. 154(b) by 95 days.

(21) Appl. No.: 17/032,451

(22) Filed: Sep. 25, 2020

(65) Prior Publication Data
US 2021/0102649 A1 Apr. 8, 2021

(30) Foreign Application Priority Data

Oct. 2, 2019 (JP) .................................. 2019-182196

(51) Int. Cl.
*F16L 33/34* (2006.01)
*B29C 65/00* (2006.01)
*B29C 65/48* (2006.01)

(52) U.S. Cl.
CPC ............... *F16L 33/34* (2013.01); *B29C 65/48* (2013.01); *B29C 66/5221* (2013.01); *B29C 66/71* (2013.01)

(58) Field of Classification Search
CPC ............ F16L 33/34; F16L 47/02; B29C 65/48
USPC .................. 285/256, 259, 242, 241, 239
See application file for complete search history.

(56) References Cited

U.S. PATENT DOCUMENTS

| 1,752,976 | A | * | 4/1930 | Cowles | F16L 33/207 |
| | | | | | 285/259 |
| 2,024,507 | A | * | 12/1935 | Brunner | F16L 33/207 |
| | | | | | 285/259 |
| 2,443,394 | A | * | 6/1948 | Sprankl | F16L 27/0812 |
| | | | | | 285/259 |
| 3,484,121 | A | * | 12/1969 | Quinton | F16L 47/12 |
| | | | | | 285/242 |

(Continued)

FOREIGN PATENT DOCUMENTS

EP 2995844 A1 3/2016
JP H01256974 A 10/1989

(Continued)

OTHER PUBLICATIONS

European Search Report issued for EP Application No. 20197173.6, entitled "Joint Structure, Joint Unit and Assembly Method of Joint Unit," mailed on Nov. 17, 2020.

*Primary Examiner* — David Bochna
(74) *Attorney, Agent, or Firm* — Hamilton, Brook, Smith & Reynolds, P.C.

(57) ABSTRACT

Provided is a joint structure comprising a main body, a tubular part that is formed in a tubular shape to protrude from the main body along an axis and holds an outer peripheral surface of the resin-made tube, and a protrusion that is formed in a shaft shape to protrude from the main body along the axis and forms, between the protrusion and the tubular part, an insertion groove in which the resin-made tube is inserted, the main body and the protrusion are formed with a coupling channel extending along the axis and coupling a liquid transferring channel and another channel, and a tip of the protrusion is disposed at a position closer to the main body than a tip of the tubular part.

10 Claims, 11 Drawing Sheets

(56) References Cited

U.S. PATENT DOCUMENTS

| | | | | |
|---|---|---|---|---|
| 4,049,034 A | * | 9/1977 | Vcelka | A61J 1/1475 285/423 |
| 4,137,117 A | * | 1/1979 | Jones | F16L 47/02 156/303.1 |
| 4,592,749 A | * | 6/1986 | Ebling | A61M 39/12 285/239 |
| 4,838,873 A | * | 6/1989 | Landskron | A61M 25/0014 604/905 |
| 7,067,032 B1 | * | 6/2006 | Bremont | F16L 47/02 285/915 |
| 9,194,518 B2 | * | 11/2015 | Chaloupka | F16L 33/34 |
| 10,113,675 B2 | * | 10/2018 | Puskas | B29C 65/48 |
| 2003/0102671 A1 | * | 6/2003 | Fritze | F16L 47/02 285/423 |
| 2003/0192641 A1 | * | 10/2003 | Espejo | B29C 65/4875 156/272.4 |
| 2004/0204690 A1 | | 10/2004 | Yashiro et al. | |
| 2009/0051160 A1 | | 2/2009 | Kanner | |
| 2010/0052317 A1 | * | 3/2010 | Mezzalira | F16L 33/34 285/330 |
| 2013/0118629 A1 | | 5/2013 | Mezzalira | |
| 2016/0116096 A1 | | 4/2016 | Fujii et al. | |
| 2016/0271965 A1 | | 9/2016 | Miyamoto et al. | |
| 2017/0021561 A1 | * | 1/2017 | Mezzalira | F16L 33/34 |
| 2017/0045068 A1 | * | 2/2017 | Sikorski | B29C 65/48 |
| 2017/0045163 A1 | * | 2/2017 | Popov | F16L 33/34 |
| 2017/0096995 A1 | | 4/2017 | Imai et al. | |

FOREIGN PATENT DOCUMENTS

| | | |
|---|---|---|
| JP | 2000116796 A | 4/2000 |
| JP | 2009/72574 A | 4/2009 |
| JP | 2009/543005 A | 12/2009 |
| JP | 2010/75998 A | 4/2010 |
| JP | 2016/174892 A | 10/2016 |
| JP | 2017-067054 A | 4/2017 |
| WO | 97/29284 | 8/1997 |
| WO | 2010/010884 A1 | 1/2010 |

* cited by examiner

JOINT STRUCTURE, JOINT UNIT AND ASSEMBLY METHOD OF JOINT UNIT

RELATED APPLICATION(S)

This application claims priority under 35 U.S.C. § 119 or 365 to Japan, Application No. 2019-182196, filed Oct. 2, 2019. The entire teachings of the above application(s) are incorporated herein by reference.

BACKGROUND

The present disclosure relates to a joint structure, a joint unit and an assembly method of the joint unit.

Heretofore, a tube pump (a peristaltic pump) has been known that comprises a pair of roller parts rotating about an axis while being in contact with a tube through which a liquid flows (e.g., see JP 2017-67054). In the tube pump disclosed in JP 2017-67054, the pair of roller parts are rotated about the axis in the same direction, to discharge, to an outflow side, the liquid flowing from an inflow side into the tube.

SUMMARY

A tube for use in a tube pump repeatedly comes in contact with a pair of roller parts, and is therefore required to have a durability to a pressing force from the roller parts. Consequently, it is necessary to set a tube thickness (a half of a difference between an outer diameter and an inner diameter of the tube) to a thickness sufficient to obtain a desired durability. The tube is formed of, for example, a resin material having a flexibility, but a rigidity of the tube having the sufficient thickness is comparatively high.

Furthermore, for example, in a use application to, for example, culture of cells for use in regenerative medicine, a flow rate of culture fluid or the like to be conveyed per unit time by a tube pump may be required to be an extremely micro flow rate (e.g., from about 0.01 ml/min to 1 ml/min). The tube for such an application use has an extremely small inner diameter of a channel (e.g., 0.30 mm). Furthermore, in a case of coupling the tube for use in the tube pump to another channel, a joint structure comprising a joint part to be partially inserted in the channel of the tube is required to couple these channels.

However, in a case where the inner diameter of the channel is smaller than the thickness of the tube, an operation of elastically deforming the channel of the tube having high rigidity and inserting the joint part in the channel is difficult. In particular, in a case where the inner diameter of the channel is extremely small, an operation of inserting the joint part while visually recognizing the channel is difficult.

The present disclosure has been developed in view of such situations, and an object of the present disclosure is to provide a joint structure, a joint unit, and an assembly method of the joint unit, in which an operator can easily perform an operation of inserting a protrusion in a liquid transferring channel without visually recognizing the liquid transferring channel formed in a resin-made tube.

Solution to the Problem

To achieve the above object, the present disclosure employs the following solutions.

A joint structure according to an aspect of the present disclosure is a joint structure attached to an end of a resin-made tube in which a liquid transferring channel extending along an axis is formed and a cross section orthogonal to the axis is round, the joint structure comprising a main body, a tubular part that is formed in a tubular shape to protrude from the main body along the axis and holds an outer peripheral surface of the resin-made tube, and a protrusion that is formed in a shaft shape to protrude from the main body along the axis and forms, between the protrusion and the tubular part, an insertion groove in which the resin-made tube is inserted, wherein the main body and the protrusion are formed with a coupling channel extending along the axis and coupling the liquid transferring channel and another channel, and a tip of the protrusion is disposed at a position closer to the main body than a tip of the tubular part.

According to the aspect of the present disclosure, the joint structure comprises the protrusion that forms the insertion groove in which the resin-made tube is inserted, between the protrusion and the tubular part that holds the outer peripheral surface of the resin-made tube, and the tip of the protrusion is disposed at the position closer to the main body than the tip of the tubular part. Consequently, if the end of the resin-made tube is brought close to the joint structure, the outer peripheral surface of the resin-made tube is held by an inner peripheral surface of the tubular part before the end of the resin-made tube comes in contact with the tip of the protrusion. The outer peripheral surface of the resin-made tube is held by the inner peripheral surface of the tubular part, and the liquid transferring channel formed in the resin-made tube is accordingly disposed on the same axis as a center axis of the tubular part.

Since the protrusion is disposed on the same axis as the center axis of the tubular part, the liquid transferring channel formed in the resin-made tube and the protrusion are arranged on the same axis. In this state, when an operator presses the resin-made tube toward the main body of the joint structure, the protrusion disposed on the same axis is inserted in the liquid transferring channel. Thus, the operator can easily perform the operation of inserting the protrusion in the liquid transferring channel without visually recognizing the liquid transferring channel formed in the resin-made tube.

In the joint structure according to an aspect of the present disclosure, it is preferable that a length of the protrusion along the axis is three times or more as large as an outer diameter of the protrusion.

In the case where the length of the protrusion along the axis is three times or more as large as the outer diameter of the protrusion, the protrusion has a needle-like shape that protrudes from the main body. When the needle-like protrusion is inserted in the liquid transferring channel of the resin-made tube, a seal region having a sufficient length can be provided between an outer peripheral surface of the protrusion and the liquid transferring channel. Furthermore, it is a difficult operation for the operator to insert the needle-like protrusion in the liquid transferring channel while visually recognizing the protrusion. However, the protrusion is inserted in the liquid transferring channel in a state where the liquid transferring channel and the protrusion are arranged on the same axis, and hence the operator can easily perform the operation of inserting the protrusion in the liquid transferring channel.

In the joint structure according to an aspect of the present disclosure, it is preferable that a length from the tip of the protrusion to the tip of the tubular part is 0.2 times or more as large as an inner diameter of the tubular part.

Since the length from the tip of the protrusion to the tip of the tubular part is 0.2 times or more as large as the inner diameter of the tubular part, the end of the resin-made tube comes in contact with the tip of the protrusion in a state where the end of the resin-made tube is inserted as much as the sufficient length relative to the inner diameter of the tubular part. Consequently, the operation of inserting the protrusion in the liquid transferring channel can be performed in a state where the outer peripheral surface of the resin-made tube is securely held by the inner peripheral surface of the tubular part.

According to an aspect of the present disclosure, a joint unit comprises the joint structure according to any one of the above aspects, and the resin-made tube, wherein an outer diameter of the protrusion is larger than an inner diameter of the liquid transferring channel, and an outer diameter of the resin-made tube is smaller than an inner diameter of the tubular part.

The outer diameter of the protrusion is larger than the inner diameter of the liquid transferring channel. Therefore, upon insertion of the protrusion in the liquid transferring channel, the liquid transferring channel is elastically deformed so that the inner diameter of the liquid transferring channel increases up to a size of the outer diameter of the protrusion. A seal region is formed between the resin-made tube and an outer peripheral surface of the protrusion by a contraction force due to the elastic deformation. Furthermore, the outer diameter of the resin-made tube is smaller than the inner diameter of the tubular part. Therefore, even if the outer diameter of the resin-made tube increases due to the increase in inner diameter of the liquid transferring channel, the resin-made tube can be inserted in the insertion groove.

In the joint unit according to an aspect of the present disclosure, it is preferable that the outer diameter of the resin-made tube is three times or more and 15 times or less as large as an inner diameter of the resin-made tube.

Since the outer diameter of the resin-made tube is sufficiently larger than the inner diameter thereof, the resin-made tube is provided with a sufficient thickness. Therefore, for example, also in a case where durability to a pressing force is required as in use in a tube pump, sufficient rigidity and corresponding durability can be exerted. Furthermore, in a case of using the resin-made tube having high rigidity, it is difficult to insert the protrusion for the elastic deformation. However, it is possible to perform an operation of inserting the protrusion in the liquid transferring channel in a state where the outer peripheral surface of the resin-made tube is held by the inner peripheral surface of the tubular part, and hence the protrusion can be easily inserted in the resin-made tube.

In the joint unit according to an aspect of the present disclosure, it is preferable that the inner diameter of the resin-made tube is 0.1 mm or more and 1.0 mm or less.

Since the inner diameter of the resin-made tube is an extremely small diameter of 0.1 mm or more and 1.0 mm or less, a flow rate of a liquid flowing through the channel formed in the resin-made tube per unit time can be maintained to be small. Furthermore, even if the inner diameter of the resin-made tube is the extremely small diameter of 0.1 mm or more and 1.0 mm or less, the operation of inserting the protrusion in the liquid transferring channel can be easily performed without visually recognizing the liquid transferring channel formed in the resin-made tube.

An assembly method of a joint unit according to an aspect of the present disclosure is an assembly method of a joint unit comprising a resin-made tube in which a liquid transferring channel extending along an axis is formed and a cross section orthogonal to the axis is round, and a joint structure attached to an end of the resin-made tube, the joint structure comprising a main body, a tubular part that is formed in a tubular shape to protrude from the main body along the axis and holds an outer peripheral surface of the resin-made tube, and a protrusion that is formed in a shaft shape to protrude from the main body along the axis and forms, between the protrusion and the tubular part, an insertion groove in which the resin-made tube is inserted, wherein an outer diameter of the protrusion is larger than an inner diameter of the liquid transferring channel, an outer diameter of the resin-made tube is smaller than an inner diameter of the tubular part, and a tip of the protrusion is disposed at a position closer to the main body than a tip of the tubular part, the method comprising an applying step of applying an adhesive to at least one of an outer peripheral surface of the end of the resin-made tube and an inner peripheral surface of the tubular part, an insertion step of inserting the protrusion in the liquid transferring channel of the resin-made tube to which the adhesive is applied in the applying step, and a bonding step of curing the adhesive applied in the applying step, and bonding the outer peripheral surface of the resin-made tube in which the protrusion is inserted in the insertion step and the inner peripheral surface of the tubular part.

In the assembly method of the joint unit according to the aspect of the present disclosure, the protrusion is inserted in the liquid transferring channel of the resin-made tube in the insertion step, in a state where the adhesive is applied to at least one of the outer peripheral surface of the end of the resin-made tube and the inner peripheral surface of the tubular part in the applying step. When inserting the protrusion in the liquid transferring channel of the resin-made tube, the protrusion is disposed on the same axis as a center axis of the tubular part. Consequently, the operator can easily perform an operation of inserting the protrusion in the liquid transferring channel without visually recognizing the liquid transferring channel formed in the resin-made tube. Furthermore, in the bonding step, the adhesive is cured to bond the outer peripheral surface of the resin-made tube and the inner peripheral surface of the tubular part.

Advantageous Effect

According to the present disclosure, there can be provided a joint structure, a joint unit, and an assembly method of the joint unit, in which an operator can easily perform an operation of inserting a protrusion in a liquid transferring channel without visually recognizing the liquid transferring channel formed in a resin-made tube.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

First Embodiment

Figure 1:
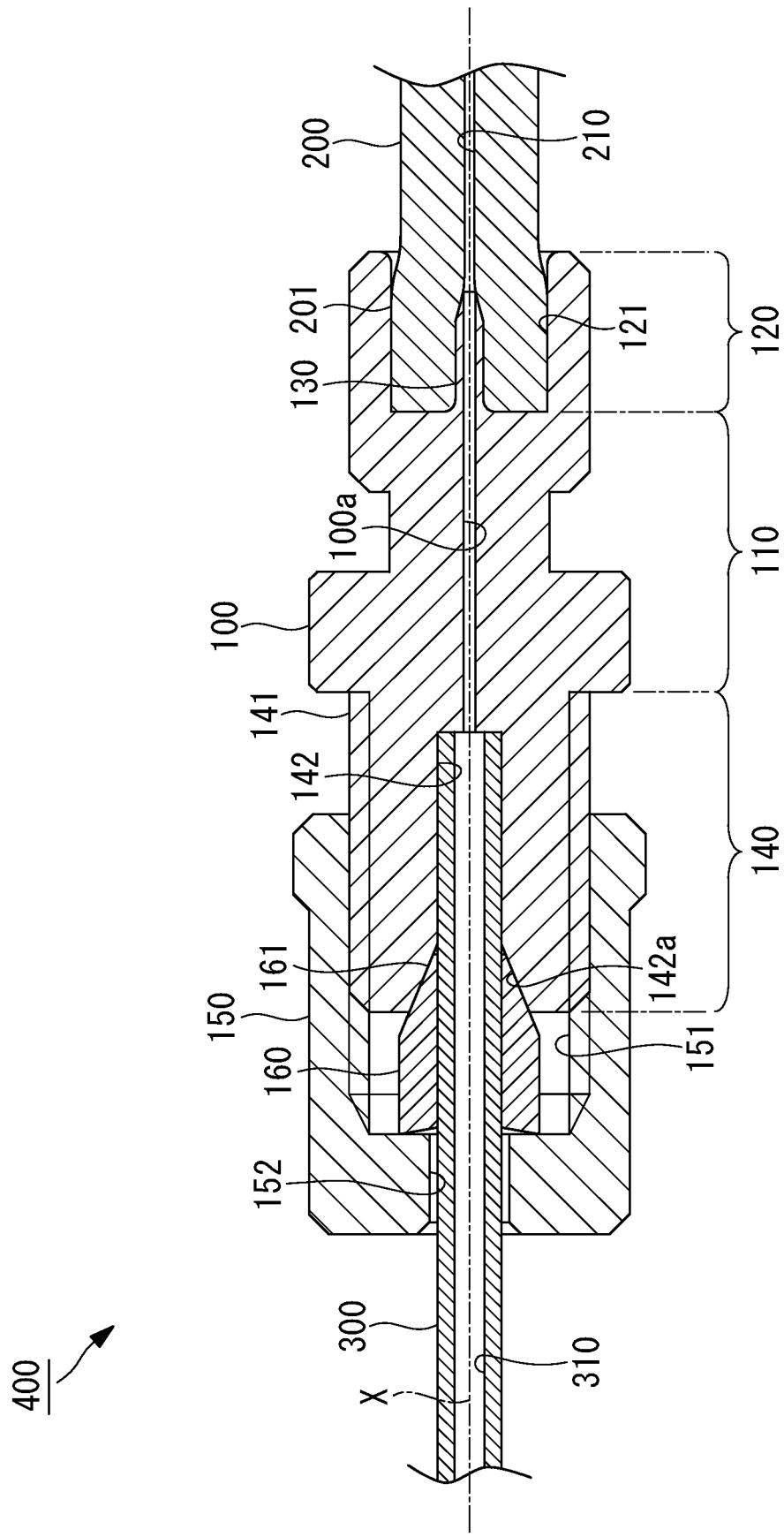
FIG. 1 is a longitudinal cross-sectional view showing a joint unit according to a first embodiment of the present disclosure.
Figure 2:
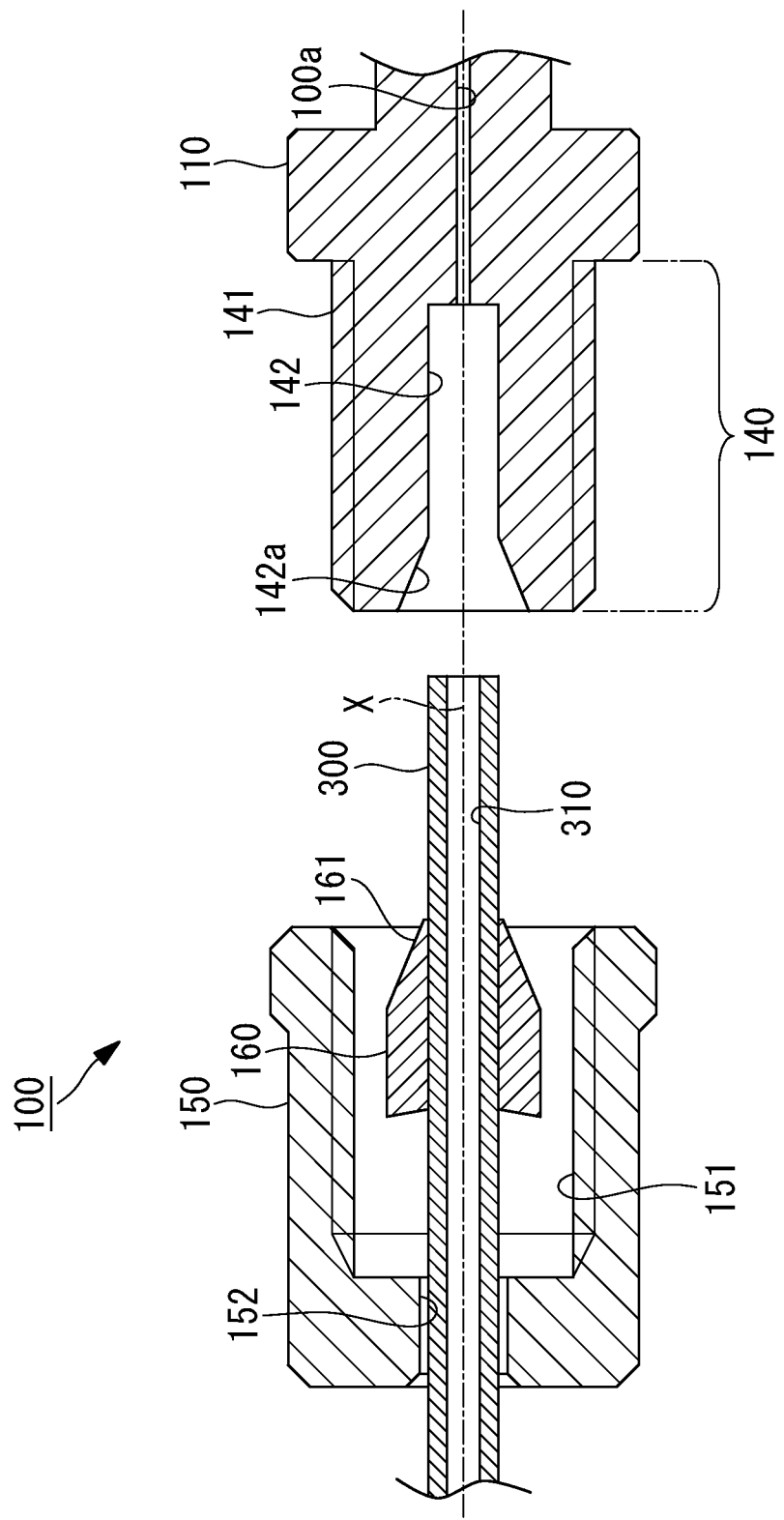
FIG. 2 is a longitudinal cross-sectional view showing a state where an attaching nut is removed from the joint unit shown in FIG. 1.
Figure 3:
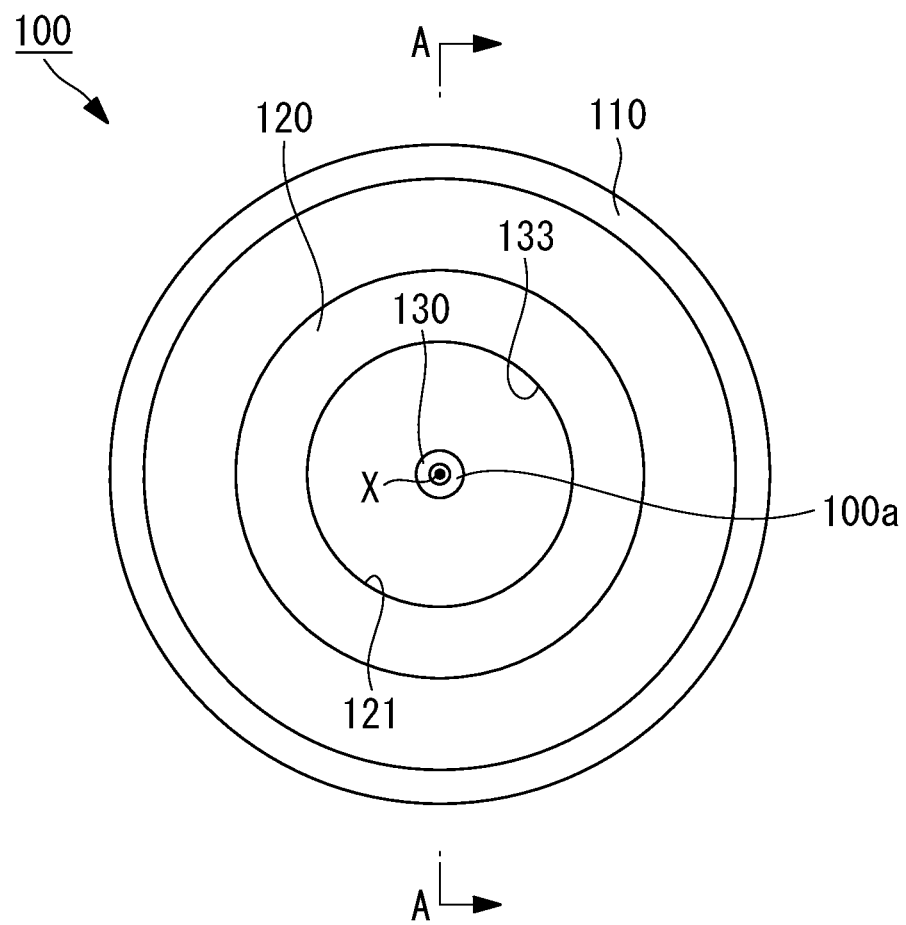
FIG. 3 is a side view of a joint structure shown in FIG. 1 and seen from a resin-made tube side.
Figure 4:
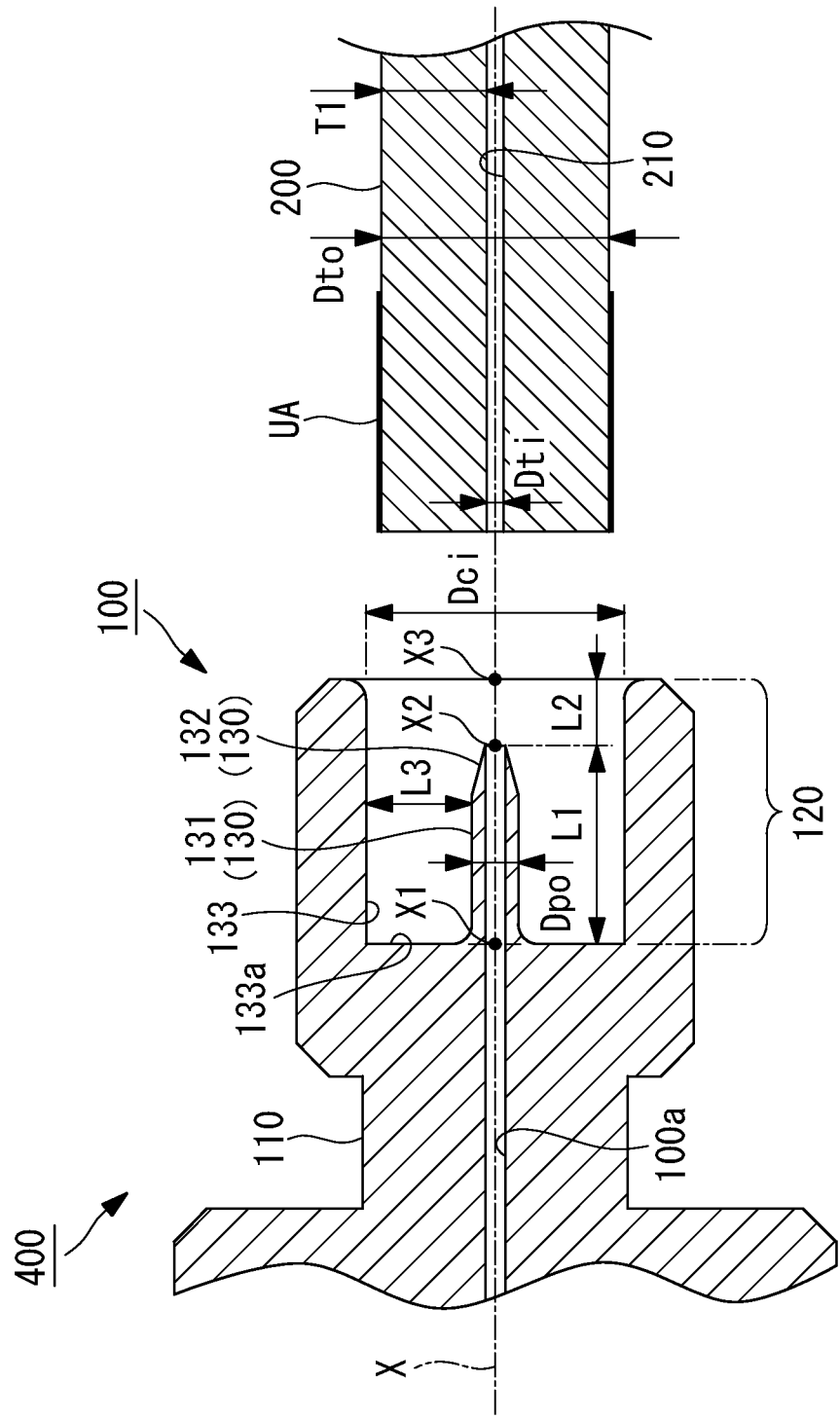
FIG. 4 is a view taken along arrows A-A of the joint structure shown in FIG. 3, and shows a state prior to insertion of a resin-made tube.

Hereinafter, description will be made as to a joint unit 400 of a first embodiment of the present disclosure with reference to the drawings. FIG. 1 is a longitudinal cross-sectional view showing a joint unit 400 according to the present embodiment. FIG. 2 is a longitudinal cross-sectional view showing a state where an attaching nut 150 is removed from the joint unit 400 shown in FIG. 1. FIG. 3 is a side view of a joint structure 100 shown in FIG. 1 and seen from a resin-made tube 200 side. FIG. 4 is a view taken along arrows A-A of the joint structure 100 shown in FIG. 3, and shows a state prior to insertion of the resin-made tube 200.

As shown in FIG. 1, the joint unit 400 of the present embodiment comprises the joint structure 100, the resin-made tube 200, and a resin-made tube 300. The joint structure 100 is a structure having one end side (a right side of FIG. 1) to which an end of the resin-made tube 200 is attached, and the other end side (a left side of FIG. 1) to which an end of the resin-made tube 300 is attached. The joint structure 100 couples a liquid transferring channel 210 of the resin-made tube 200 and a liquid transferring channel 310 of the resin-made tube 300 so that a liquid flows through these channels.

The joint structure 100 includes a main body 110, a tubular part 120, a protrusion 130, an internal thread part 140, the attaching nut 150, and a ferrule 160. The main body 110, the protrusion 130 and the internal thread part 140 are formed with a coupling channel 100a extending along an axis X and coupling the liquid transferring channel 210 of the resin-made tube 200 and the liquid transferring channel 310 of the resin-made tube 300.

The main body 110 is disposed between the tubular part 120 and the protrusion 130, and the internal thread part 140, and has an interior formed with the coupling channel 100a. The main body 110 is formed of a resin material (e.g., polyvinyl chloride (PVC), or polycarbonate) integrally with the tubular part 120, the protrusion 130, and the internal thread part 140.

The tubular part 120 is formed in a tubular shape to protrude from the main body 110 along the axis X to the resin-made tube 200 side. As shown in FIG. 2 and FIG. 3, the tubular part 120 includes a cylindrical inner peripheral surface 121 that holds an outer peripheral surface 201 of the resin-made tube 200.

The protrusion 130 is formed in a shaft shape to protrude from the main body 110 along the axis X to the resin-made tube 200 side. As shown in FIG. 4, the protrusion 130 includes a base 131 having an outer diameter Dpo, and a tip portion 132 having an outer diameter that gradually decreases toward a tip. As shown in FIG. 3 and FIG. 4, the protrusion 130 forms, between the protrusion and the tubular part 120, an insertion groove 133 in which the resin-made tube 200 is inserted. A bottom 133a of the insertion groove 133 corresponds to a boundary position between the main body 110 and the protrusion 130.

As shown in FIG. 4, a boundary position between the main body 110 and the protrusion 130 on the axis X is denoted with X1, a position of the protrusion 130 on the axis X is denoted with X2, and a position of the tubular part 120 on the axis X is denoted with X3. In this case, the position X2 of a tip of the protrusion 130 is disposed closer to the position X1 of an end of the main body 110 on a protrusion 130 side than the position X3 of a tip of the tubular part 120.

As shown in FIG. 4, a length L2 from the tip of the protrusion 130 to the tip of the tubular part 120 is the length L2 from X2 to X3 in an axis X direction. Furthermore, an inner diameter of the tubular part 120 is denoted with Dci. It is preferable that the length L2 from the tip of the protrusion 130 to the tip of the tubular part 120 is 0.2 times or more as large as the inner diameter Dci of the tubular part 120.

Since the length L2 is 0.2 times or more as large as the inner diameter Dci, the end of the resin-made tube 200 comes in contact with the tip of the protrusion 130 in a state where the end of the resin-made tube 200 is inserted as much as the sufficient length L2 relative to the inner diameter Dci of the tubular part 120. Consequently, the operation of inserting the protrusion 130 in the liquid transferring channel 210 can be performed in a state where the outer peripheral surface of the resin-made tube 200 is securely held by the inner peripheral surface of the tubular part 120.

As shown in FIG. 4, a length of the protrusion 130 along the axis X is a length L1 from X1 to X2 in the axis X direction. Furthermore, the outer diameter of the protrusion 130 is denoted with Dpo. It is preferable that the length L1 of the protrusion 130 is three times or more as large as the outer diameter Dpo of the protrusion 130. In a case where the length L1 of the protrusion 130 is three times or more as large as the outer diameter Dpo of the protrusion 130, the protrusion 130 has a needle-like shape that protrudes from the main body 110. When the needle-like protrusion 130 is inserted in the liquid transferring channel 210 of the resin-made tube 200, a seal region having a sufficient length can be provided between an outer peripheral surface of the protrusion 130 and the liquid transferring channel 210.

The internal thread part 140 is a tubular member coupled to the main body 110 and extending along the axis X, and has an outer peripheral surface formed with an internal thread 141. In a center portion of the internal thread part 140 along the axis X, an insertion hole 142 is formed in which the end of the resin-made tube 300 is inserted. An end of the insertion hole 142 on a main body 110 side is coupled to the coupling channel 100a.

As shown in FIG. 2, in an end of the insertion hole 142 on a resin-made tube 300 side, a taper part 142a is provided in which a tip of the ferrule 160 is inserted. The taper part 142a is formed in a shape having an outer diameter around the axis X that gradually decreases from an end of the internal thread part 140 on the resin-made tube 300 side toward the coupling channel 100a with a constant gradient.

The attaching nut 150 is a member detachably attached to the internal thread part 140, formed in a tubular shape along the axis X, and has an inner peripheral surface formed with an external thread 151. The operator engages the external thread 151 with the internal thread 141 while rotating the attaching nut 150 about the axis X, to attach the attaching nut 150 to the internal thread part 140.

In the attaching nut 150, a through hole 152 is formed through which the resin-made tube 300 is passed. As shown in FIG. 2, the operator inserts the resin-made tube 300 to pass the tube through the through hole 152, and attaches the ferrule 160 to the resin-made tube 300 passed through the through hole 152. Afterward, the operator inserts the resin-made tube 300 in the insertion hole 142 of the internal thread part 140, and attaches the attaching nut 150 to the internal thread part 140, to obtain an attached state shown in FIG. 1.

The ferrule 160 is a member made of a resin (e.g., polytetrafluoroethylene (PTFE)) and formed in a cylindrical shape to be inserted between an outer peripheral surface of the resin-made tube 300 and the taper part 142a of the internal thread part 140. As shown in FIG. 2, in an end of the ferrule 160 on an internal thread part 140 side, a tapered tip portion 161 having an outer diameter that gradually decreases toward the insertion hole 142 is formed.

As shown in FIG. 2, the ferrule 160 is movable in the axis X direction to the resin-made tube 300 in a state where the attaching nut 150 is not attached to the internal thread part 140. In the ferrule 160, when the attaching nut 150 is attached to the internal thread part 140, the tip portion 161 comes in contact with the taper part 142a, and an inner diameter gradually decreases. The ferrule 160 firmly holds the outer peripheral surface of the resin-made tube 300 as the inner diameter decreases. In the attached state shown in FIG. 1, the resin-made tube 300 is not movable in the axis X direction to the ferrule 160.

The resin-made tube 200 is a tubular body in which the liquid transferring channel 210 extending along the axis X is formed, and a cross section orthogonal to the axis X is round. The resin-made tube 200 is made of a resin material such as polyvinyl chloride (PVC), silicone, or PharMed (registered trademark). The resin-made tube 200 is attached to the tubular part 120 and the protrusion 130 arranged in an end of the joint structure 100.

As shown in FIG. 4, the outer diameter Dpo of the protrusion 130 is larger than an inner diameter Dti of the liquid transferring channel 210 of the resin-made tube 200, in a non-inserted state where the protrusion 130 of the joint structure 100 is not inserted in the liquid transferring channel 210 of the resin-made tube 200. Furthermore, an outer diameter Dto of the resin-made tube 200 is smaller than the inner diameter Dci of the tubular part 120.

A thickness T1 of the resin-made tube 200 is (Dto-Dti)/2. A distance L3 between an inner peripheral surface of the tubular part 120 and the outer peripheral surface of the protrusion 130 is (Dci-Dpo)/2. The thickness T1 of the resin-made tube 200 is equal to the distance L3, or slightly smaller than the distance L3. With such a relation, when the resin-made tube 200 is inserted in the protrusion 130, an outer peripheral surface of the resin-made tube 200 is in contact with the inner peripheral surface of the tubular part 120 or close to the inner peripheral surface via a minute space.

In the non-inserted state, the outer diameter Dto of the resin-made tube 200 is three times or more and 15 times or less as large as the inner diameter Dti. Furthermore, it is preferable that the outer diameter Dto of the resin-made tube 200 is seven times or more and eight times or less as large as the inner diameter Dti. Since the outer diameter Dto of the resin-made tube 200 is sufficiently larger than the inner diameter Dti, the resin-made tube 200 is provided with the sufficient thickness T1.

The resin-made tube 200 of the present embodiment can be suitably used in, for example, a tube pump (a peristaltic pump). In the tube pump, the resin-made tube 200 is installed in a tube holding mechanism (not shown) having a cylindrical inner peripheral surface. The tube pump includes a roller member that rotates while being in contact with the resin-made tube 200, and crushing of the resin-made tube 200 between the cylindrical inner peripheral surface and the roller member allows a fluid in the resin-made tube 200 to flow through the tube. Since the resin-made tube 200 of the present embodiment is provided with the sufficient thickness T1 as described above, sufficient rigidity and corresponding durability can be exerted also in a case where durability to a pressing force of the roller member is required.

The inner diameter Dti of the resin-made tube 200 is 0.1 mm or more and 1.0 mm or less. Since the inner diameter Dti of the resin-made tube 200 is an extremely small diameter of 0.1 mm or more and 1.0 mm or less, a flow rate of a liquid flowing through the liquid transferring channel 210 formed in the resin-made tube 200 per unit time can be maintained to be small.

The resin-made tube 300 is a tubular body in which the liquid transferring channel 310 extending along the axis X is formed, and a cross section orthogonal to the axis X is round. The resin-made tube 300 is made of, for example, a resin material such as polyvinyl chloride (PVC), silicone, or PharMed (registered trademark). The resin-made tube 300 is attached to the internal thread part 140 disposed in the end of the joint structure 100.

Figure 5:
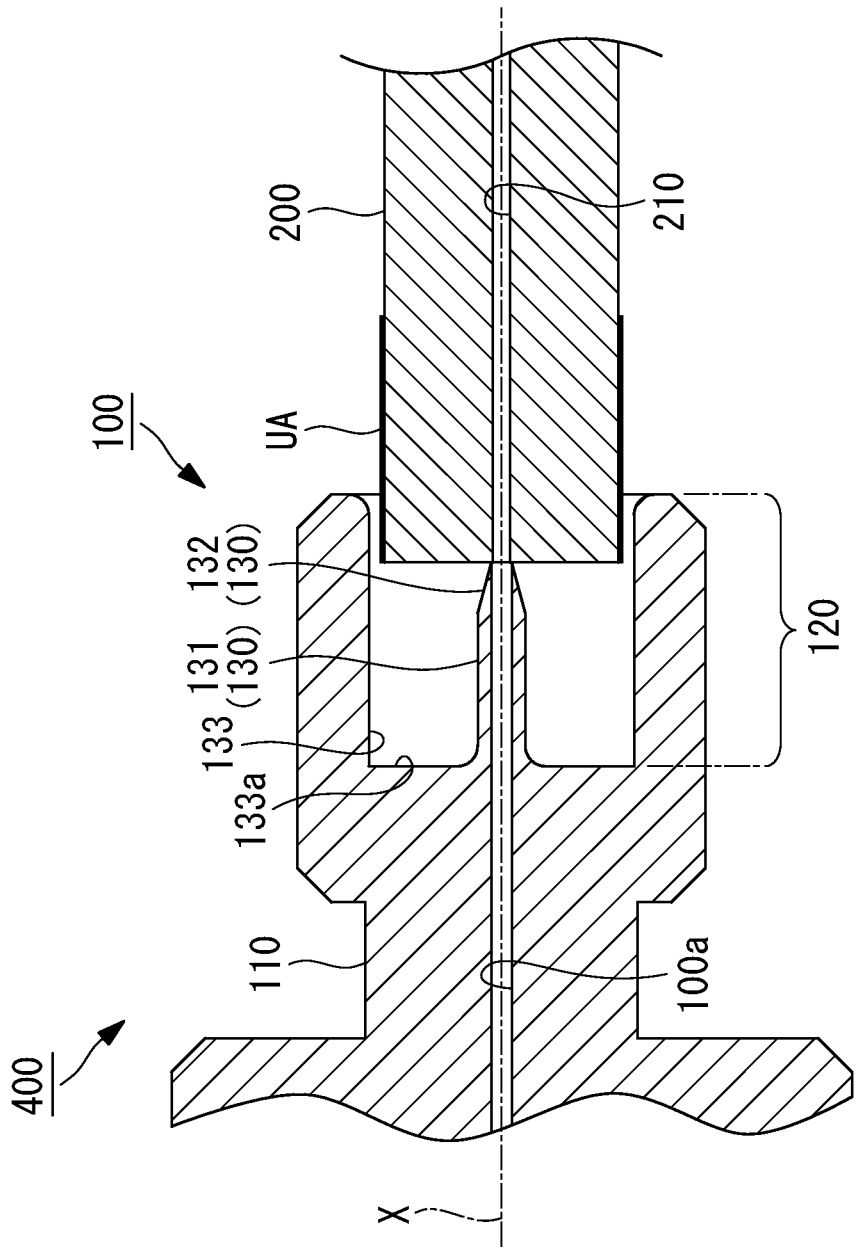
FIG. 5 is a view taken along the arrows A-A of the joint structure shown in FIG. 3, and shows a state where a part of the resin-made tube is inserted in a tubular part.
Figure 6:
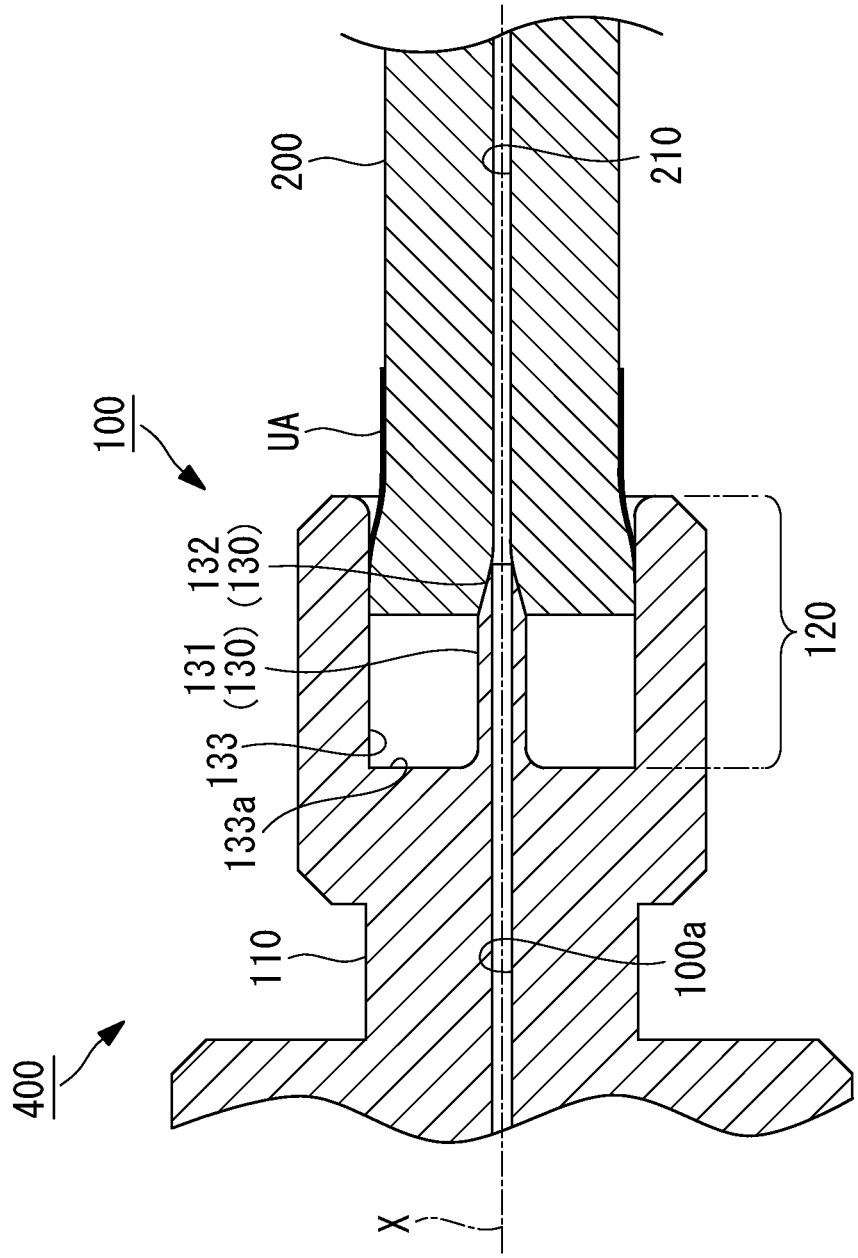
FIG. 6 is a view taken along the arrows A-A of the joint structure shown in FIG. 3, and shows a state where a tip of a protrusion is inserted in a liquid transferring channel of the resin-made tube.
Figure 7:
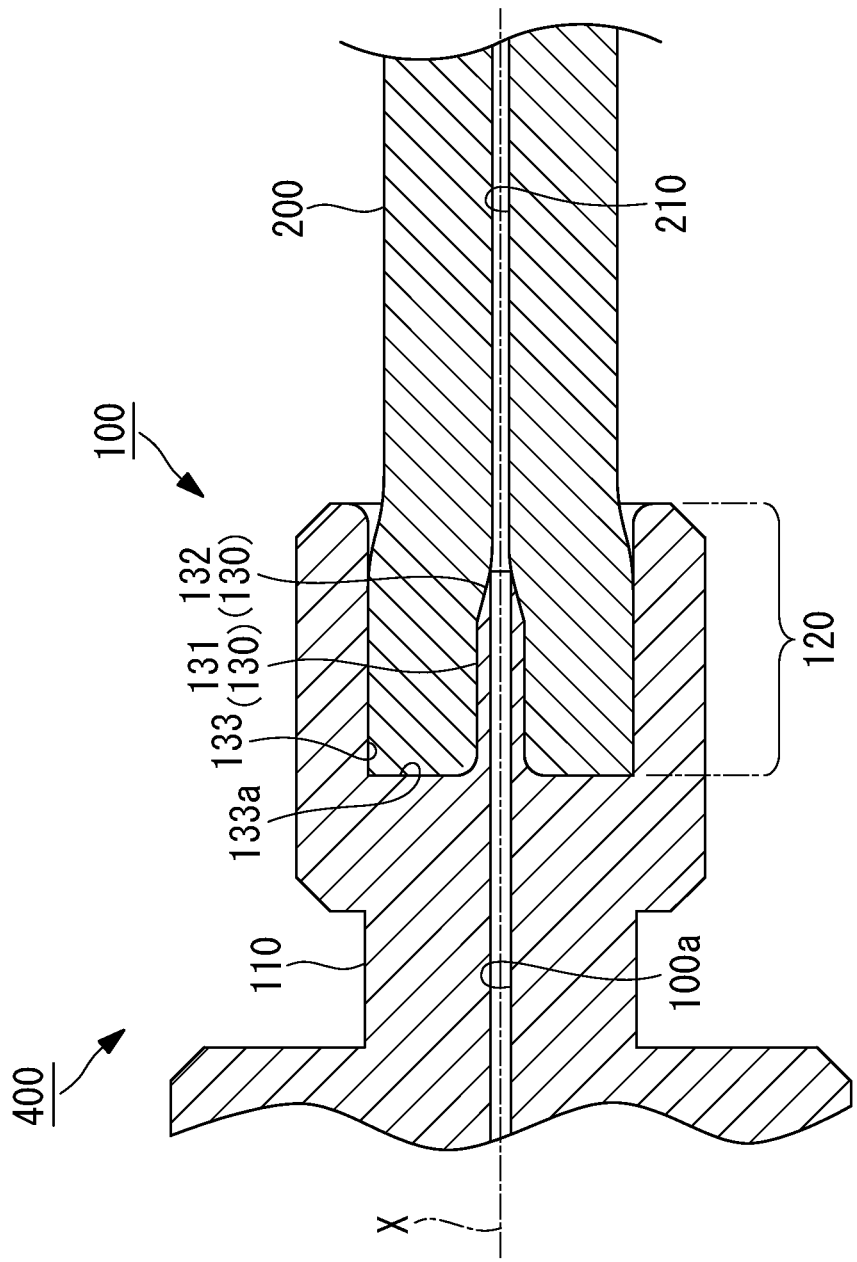
FIG. 7 is a view taken along the arrows A-A of the joint structure shown in FIG. 3, and shows a state where the insertion of the resin-made tube is completed.

Next, description will be made as to an assembly method of the joint unit 400 of the present embodiment with reference to the drawings. FIG. 4 to FIG. 7 are views taken along arrows A-A of the joint structure 100 shown in FIG. 3, and FIG. 4 shows a state prior to the insertion of the resin-made tube 200. FIG. 5 shows a state where a part of the resin-made tube 200 is inserted in the tubular part 120. FIG. 6 shows a state where the tip of the protrusion 130 is inserted in the liquid transferring channel 210 of the resin-made tube 200, and FIG. 7 shows a state where the insertion of the resin-made tube 200 is completed.

The assembly method of the joint unit 400 of the present embodiment includes attaching the end of the resin-made tube 200 to one end side (a right side of FIG. 1) of the joint structure 100, and attaching the end of the resin-made tube 300 to the other end side (a left side of FIG. 1). First, description will be made as to a method of attaching the end of the resin-made tube 200 to the one end side (the right side of FIG. 1) of the joint structure 100.

As shown in FIG. 4, in the state prior to the insertion of the resin-made tube 200 in the joint structure 100, the operator applies an adhesive UA (e.g., an ultraviolet curable adhesive) to the outer peripheral surface of the end of the resin-made tube 200 (an applying step). Note that the adhesive UA may be applied to both the outer peripheral surface of the end of the resin-made tube 200 and the inner peripheral surface of the tubular part 120. Alternatively, the adhesive UA does not have to be applied to the outer peripheral surface of the end of the resin-made tube 200, and may be applied to the inner peripheral surface of the tubular part 120.

Next, the operator grasps both the resin-made tube 200 and the joint structure 100, and inserts the end of the resin-made tube 200, to which the adhesive UA is applied, in the tubular part 120 of the joint structure 100 on an inner peripheral side. As shown in FIG. 5, the end of the resin-made tube 200 comes in contact with the tip portion 132 of the protrusion 130 of the joint structure 100. In a state shown in FIG. 5, the outer peripheral surface of the resin-made tube 200 is held by the inner peripheral surface of the tubular part 120. That is, even if the operator moves the resin-made tube 200 in a direction orthogonal to the axis X, the outer peripheral surface of the resin-made tube 200 comes in contact with the inner peripheral surface of the tubular part 120, to maintain a state where the tube is disposed on the inner peripheral side of the tubular part 120.

Next, the operator pushes the end of the resin-made tube 200 toward the bottom 133a of the insertion groove 133 while grasping both the resin-made tube 200 and the joint structure 100. As shown in FIG. 6, when pushing the end of the resin-made tube 200 toward the bottom 133a of the insertion groove 133, the tip portion 132 of the protrusion 130 of the joint structure 100 is inserted in the liquid transferring channel 210 of the resin-made tube 200 (an insertion step).

In a case where the end of the resin-made tube 200 is pushed toward the bottom 133a of the insertion groove 133, if the tubular part 120 is not present, a position of the tip portion 132 of the protrusion 130 may be shifted from a position of the liquid transferring channel 210 of the resin-made tube 200 by the operator's operation of pushing the resin-made tube 200 inward. In the present embodiment, since the outer peripheral surface of the resin-made tube 200 is held by the inner peripheral surface of the tubular part 120, the position of the tip portion 132 of the protrusion 130 is prevented from being shifted from the position of the liquid transferring channel 210 of the resin-made tube 200.

The operator further pushes the end of the resin-made tube 200 toward the bottom 133a of the insertion groove 133 from the state shown in FIG. 6, to obtain a state shown in FIG. 7 where both the tip portion 132 and the base 131 of the protrusion 130 are inserted in the liquid transferring channel 210 of the resin-made tube 200 (the insertion step). In the state shown in FIG. 7, the end of the resin-made tube 200 is in contact with the bottom 133a of the insertion groove 133.

Next, in the joint unit 400 of the state shown in FIG. 7, the operator cures the adhesive UA (not shown) that is present between the outer peripheral surface of the resin-made tube 200 and the inner peripheral surface of the tubular part 120, to bond the outer peripheral surface of the resin-made tube 200 and the inner peripheral surface of the tubular part 120 (a bonding step). The operator irradiates a region where the adhesive UA is present with ultraviolet rays by use of an ultraviolet irradiator (not shown), to cure the adhesive UA.

Note that in a case of using a dry curing adhesive, the adhesive that is present between the outer peripheral surface of the resin-made tube 200 and the inner peripheral surface of the tubular part 120 is left to stand until dried and cured.

By the operation described above, the end of the resin-made tube 200 is attached to the one end side (the right side of FIG. 1) of the joint structure 100. Next, description will be made as to a method of attaching the end of the resin-made tube 300 to the other end side (the left side of FIG. 1) of the joint structure 100.

As shown in FIG. 2, in a state where the attaching nut 150 is not attached to the internal thread part 140, the operator inserts the resin-made tube 300 in the through hole 152. Furthermore, the operator attaches the ferrule 160 to the resin-made tube 300 passed through the through hole 152. Afterward, the operator inserts the end of the resin-made tube 300 in the insertion hole 142 of the internal thread part 140, to obtain a state where the tip portion 161 of the ferrule 160 is in contact with the taper part 142a.

The operator engages the external thread 151 with the internal thread 141 while rotating the attaching nut 150 about the axis X, to attach the attaching nut 150 to the internal thread part 140, thereby obtaining the attached state shown in FIG. 1. In the attached state shown in FIG. 1, the liquid transferring channel 210 of the resin-made tube 200 and the liquid transferring channel 310 of the resin-made tube 300 are coupled so that the liquid can flow through the coupling channel 100a of the joint structure 100.

Operations and effects produced by the above described present embodiment will be described.

According to the present embodiment, the joint structure 100 comprises the protrusion 130 that forms the insertion groove 133 in which the resin-made tube 200 is inserted, between the protrusion and the tubular part 120 that holds the outer peripheral surface of the resin-made tube 200, and the tip of the protrusion 130 is disposed at the position closer to the main body 110 than the tip of the tubular part 120. Consequently, if the end of the resin-made tube 200 is brought close to the joint structure 100, the outer peripheral surface of the resin-made tube 200 is held by the inner peripheral surface of the tubular part 120 before the end of the resin-made tube 200 comes in contact with the tip of the protrusion 130. The outer peripheral surface of the resin-made tube 200 is held by the inner peripheral surface of the tubular part 120, and the liquid transferring channel 210 formed in the resin-made tube 200 is accordingly disposed on the same axis X as the center axis of the tubular part 120.

Since the protrusion 130 is disposed on the same axis X as the center axis of the tubular part 120, the liquid transferring channel 210 formed in the resin-made tube 200 and the protrusion 130 are arranged on the same axis. In this state, when the operator presses the resin-made tube 200 toward the main body 110 of the joint structure 100, the protrusion 130 disposed on the same axis is inserted in the liquid transferring channel 210. Thus, the operator can easily perform the operation of inserting the protrusion 130 in the liquid transferring channel 210 without visually recognizing the liquid transferring channel 210 formed in the resin-made tube 200.

In the joint structure 100 of the present embodiment, the length L1 of the protrusion 130 along the axis X is three times or more as large as the outer diameter Dpo of the protrusion 130. Therefore, the protrusion 130 has the needle-like shape that protrudes from the main body 110. When the needle-like protrusion 130 is inserted in the liquid transferring channel 210 of the resin-made tube 200, the seal region having the sufficient length can be provided between the outer peripheral surface of the protrusion 130 and the liquid transferring channel 210. Furthermore, it is the difficult operation for the operator to insert the needle-like protrusion 130 in the liquid transferring channel 210 while visually recognizing the protrusion. However, the protrusion 130 is inserted in the liquid transferring channel 210 in the state where the liquid transferring channel 210 and the protrusion 130 are arranged on the same axis, and hence the operator can easily perform the operation of inserting the protrusion 130 in the liquid transferring channel 210.

In the joint unit 400 of the present embodiment, the outer diameter Dpo of the protrusion 130 is larger than the inner diameter Dti of the liquid transferring channel 210. Therefore, upon the insertion of the protrusion 130 in the liquid transferring channel 210, the liquid transferring channel is elastically deformed so that the inner diameter Dti of the liquid transferring channel 210 increases up to a size of the outer diameter Dpo of the protrusion 130. The seal region is formed between the resin-made tube 200 and the outer peripheral surface of the protrusion 130 by a contraction force due to the elastic deformation. Furthermore, the outer diameter Dto of the resin-made tube 200 is smaller than the inner diameter Dci of the tubular part 120. Therefore, even if the outer diameter Dto of the resin-made tube 200 increases due to the increase in inner diameter Dti of the liquid transferring channel 210, the resin-made tube 200 can be inserted in the insertion groove 133.

In the joint unit 400 of the present embodiment, the outer diameter Dto of the resin-made tube 200 is three times or more and 15 times or less as large as the inner diameter Dti of the resin-made tube 200. Since the outer diameter Dto of the resin-made tube 200 is sufficiently larger than the inner diameter Dti, the resin-made tube 200 is provided with the sufficient thickness T1. Therefore, for example, also in a case where durability to a pressing force of a roller is required as in use in the tube pump, sufficient rigidity and corresponding durability can be exerted. Furthermore, in a case of using the resin-made tube 200 having high rigidity, it is difficult to insert the protrusion 130 for the elastic deformation. However, the protrusion 130 can be inserted in the liquid transferring channel 210 in a state where the outer peripheral surface of the resin-made tube 200 is held by the inner peripheral surface of the tubular part 120.

In the joint unit 400 of the present embodiment, the inner diameter Dti of the resin-made tube 200 is 0.1 mm or more and 1.0 mm or less. Since the inner diameter Dti of the resin-made tube is an extremely small diameter, a flow rate of the liquid flowing through the channel formed in the resin-made tube 200 per unit time can be maintained to be small. Furthermore, even if the inner diameter Dti of the resin-made tube 200 is the extremely small diameter, the operation of inserting the protrusion 130 in the liquid transferring channel 210 can be easily performed without visually recognizing the liquid transferring channel 210 formed in the resin-made tube 200.

According to the assembly method of the joint unit 400 of the present embodiment, the protrusion 130 is inserted in the liquid transferring channel 210 of the resin-made tube 200 in the insertion step, in a state where the adhesive is applied to at least one of the outer peripheral surface of the end of the resin-made tube 200 and the inner peripheral surface of the tubular part 120 in the applying step. When inserting the protrusion 130 in the liquid transferring channel 210 of the resin-made tube 200, the protrusion 130 is disposed on the same axis X as the center axis of the tubular part 120. Consequently, the operator can easily perform the operation of inserting the protrusion 130 in the liquid transferring channel 210 without visually recognizing the liquid transferring channel 210 formed in the resin-made tube 200. Furthermore, in the bonding step, the adhesive is cured to bond the outer peripheral surface of the resin-made tube 200 to the inner peripheral surface of the tubular part 120.

Second Embodiment

Figure 8:
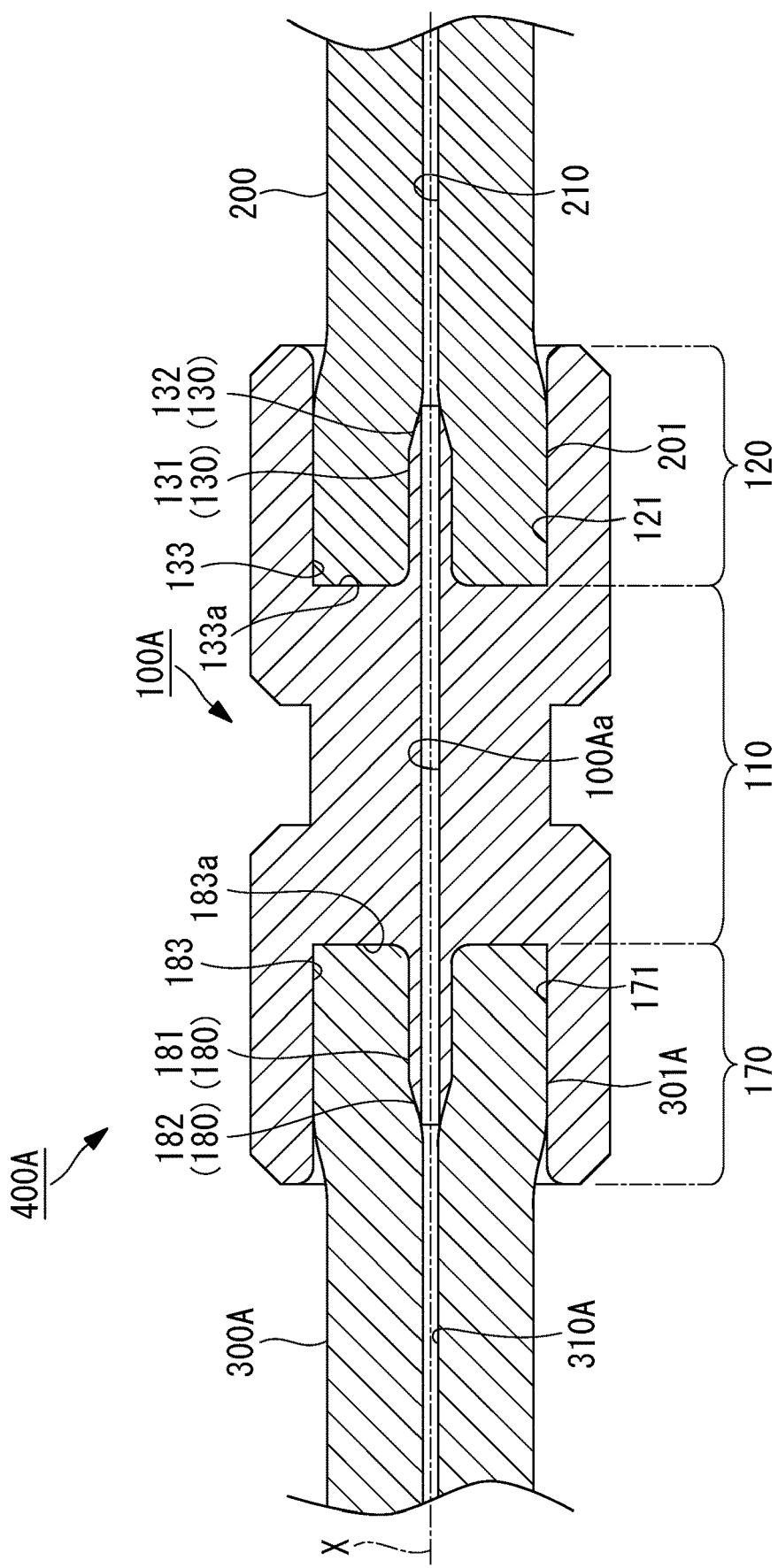
FIG. 8 is a longitudinal cross-sectional view showing a joint unit according to a second embodiment of the present disclosure.

Next, description will be made as to a joint unit 400A according to a second embodiment of the present disclosure with reference to the drawings. FIG. 8 is a longitudinal cross-sectional view showing the joint unit 400A according to the second embodiment of the present disclosure. The present embodiment is a modification of the first embodiment, and in the following description, the modification is considered to be similar to the first embodiment, and is omitted unless otherwise mentioned.

The joint structure 100 of the joint unit 400 of the first embodiment comprises the internal thread part 140 and the attaching nut 150 to couple the resin-made tube 300. On the other hand, the joint unit 400A of the present embodiment does not comprise a configuration corresponding to the internal thread part 140 and the attaching nut 150, and comprises a tubular part 170 and a protrusion 180 in place of the configuration.

As shown in FIG. 8, the joint unit 400A of the present embodiment comprises a joint structure 100A, a resin-made tube 200, and a resin-made tube 300A. The joint structure 100A is a structure having one end side (a right side of FIG. 8) to which an end of the resin-made tube 200 is attached, and the other end side (a left side of FIG. 8) to which an end of the resin-made tube 300A is attached. The joint structure 100A couples a liquid transferring channel 210 of the resin-made tube 200 and a liquid transferring channel 310A of the resin-made tube 300A so that a liquid flows through these channels.

The joint structure 100A includes a main body 110, a tubular part 120, a protrusion 130, the tubular part 170, and the protrusion 180. The main body 110, the protrusion 130 and the protrusion 180 are formed with a coupling channel 100Aa extending along an axis X and coupling the liquid transferring channel 210 of the resin-made tube 200 and the liquid transferring channel 310A of the resin-made tube 300A. The main body 110, the tubular part 120 and the protrusion 130 are similar to those of the first embodiment, and are therefore omitted from the following description.

The tubular part 170 is formed in a tubular shape to protrude from the main body 110 along the axis X to a resin-made tube 300A side. As shown in FIG. 8, the tubular part 170 includes a cylindrical inner peripheral surface 171 that holds an outer peripheral surface 301A of the resin-made tube 300.

The protrusion 180 is formed in a shaft shape to protrude from the main body 110 along the axis X to the resin-made tube 300A side. As shown in FIG. 8, the protrusion 180 includes a base 181, and a tip portion 182 having an outer diameter that gradually decreases toward a tip. As shown in FIG. 8, the protrusion 180 forms, between the protrusion and the tubular part 170, an insertion groove 183 in which the resin-made tube 300A is inserted. A bottom 183a of the insertion groove 183 corresponds to a boundary position between the main body 110 and the protrusion 180. Note that a shape of the protrusion 180 is similar to the shape of the protrusion 130, and is therefore omitted from the following description.

The resin-made tube 300A is a tubular body in which the liquid transferring channel 310A extending along the axis X is formed, and a cross section orthogonal to the axis X is round. The resin-made tube 300A is made of, for example, a resin material such as polyvinyl chloride (PVC), silicone, or PharMed (registered). The resin-made tube 300A is attached to the tubular part 170 and the protrusion 180 arranged in an end of the joint structure 100A. Note that a shape of the resin-made tube 300A is similar to the shape of the resin-made tube 200, and is therefore omitted from the following description.

An assembly method of the joint unit 400A of the present embodiment includes attaching the end of the resin-made tube 200 to the one end side (the right side of FIG. 8) of the joint structure 100A, and attaching the end of the resin-made tube 300A to the other end side (the left side of FIG. 8). A method of attaching the end of the resin-made tube 200 to the one end side of the joint structure 100A is similar to the method of attaching the resin-made tube 200 to the one end side of the joint structure 100 of the first embodiment, and is therefore omitted from the following description. Furthermore, a method of attaching the end of the resin-made tube 300A to the other end side of the joint structure 100A is similar to the method of attaching the end of the resin-made tube 200 to the one end side of the joint structure 100A, and is therefore omitted from the following description.

According to the present embodiment, the one end side (the right side of FIG. 8) and the other end side (the left side of FIG. 8) of the joint structure 100A are formed as similar structures, and the end of the resin-made tube 200 can be attached to the one end side, while the end of the resin-made tube 300A can be attached to the other end side Third Embodiment Next, description will be made as to a joint unit 400B according to a third embodiment of the present disclosure with reference to the drawings. The present embodiment is a modification of the first embodiment, and in the following description, the modification is considered to be similar to the first embodiment, and is omitted unless otherwise mentioned.

In the joint structure 100 of the joint unit 400 of the first embodiment, the main body 110, the tubular part 120 that holds the outer peripheral surface of the resin-made tube 300 and the protrusion 130 are integrally formed of the resin material. On the other hand, in the joint unit 400B of the present embodiment, a main body 110B and a protrusion 130B are integrally formed, and a tubular ferrule 120B is formed as a component separate from the main body 110B and the protrusion 130B.

Figure 9:
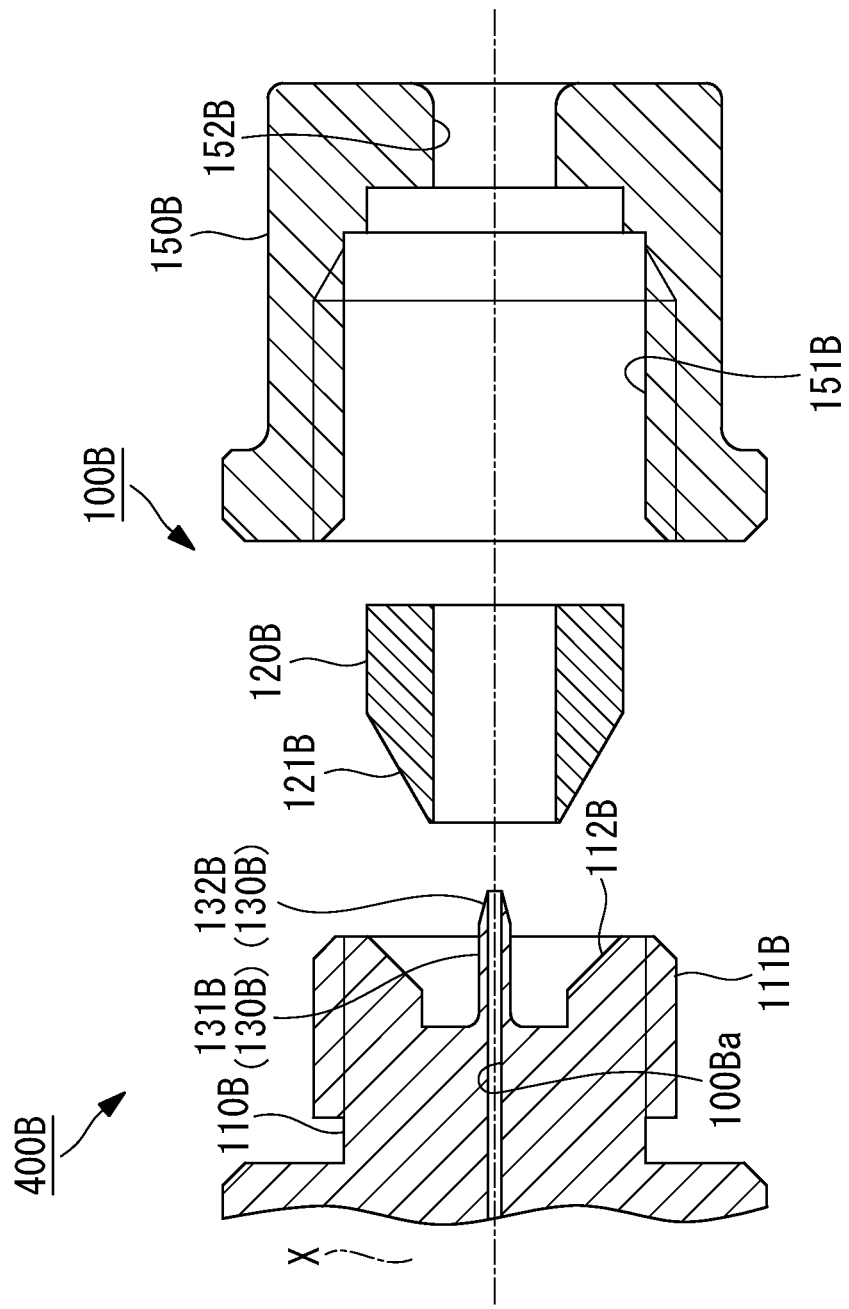
FIG. 9 is a longitudinal cross-sectional view showing a joint unit according to a third embodiment of the present disclosure, and shows a state where a main body, a ferrule and an attaching nut are disassembled.
Figure 10:
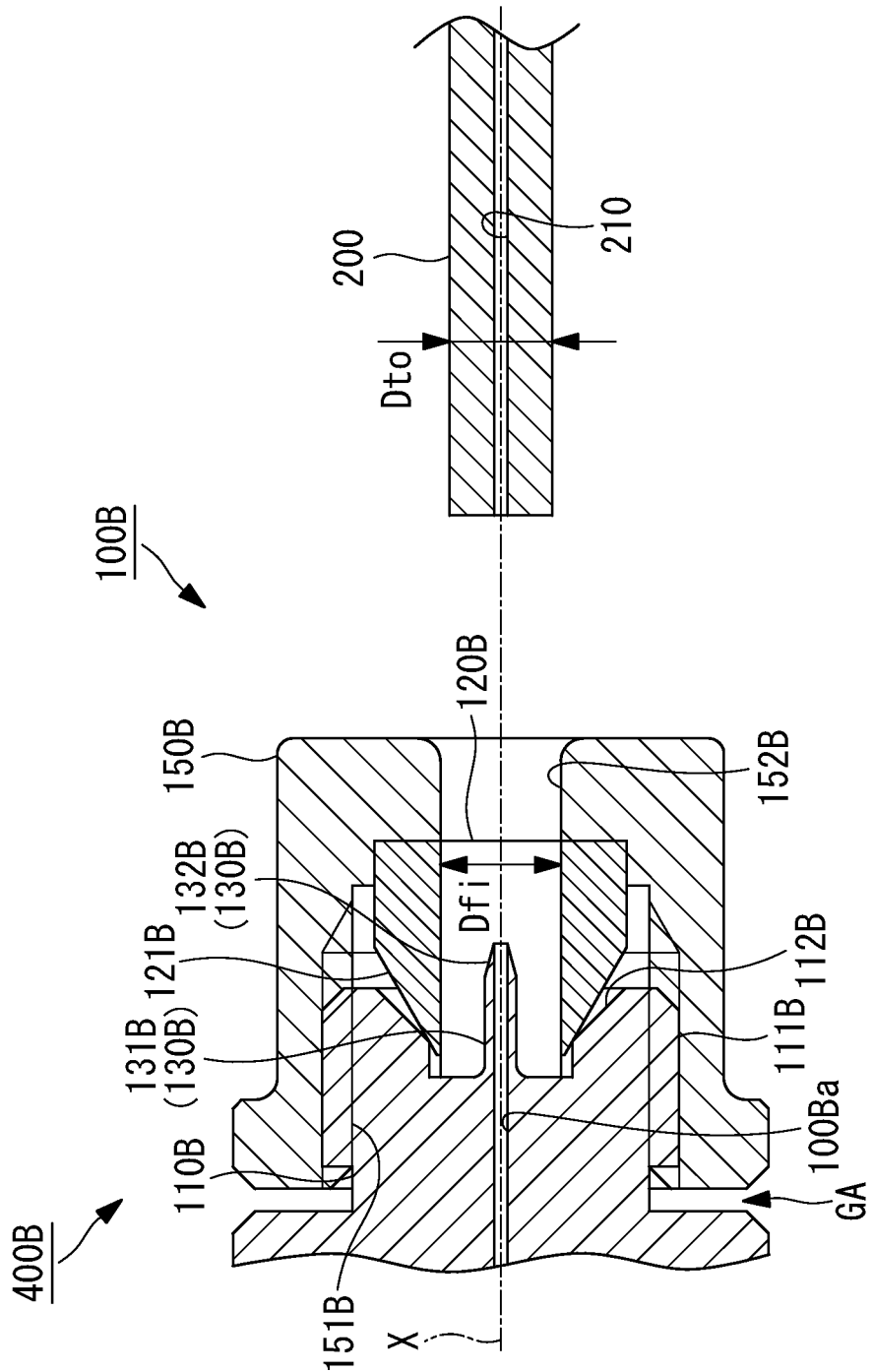
FIG. 10 is a longitudinal cross-sectional view showing the joint unit according to the third embodiment of the present disclosure, and shows a state prior to insertion of a resin-made tube.
Figure 11:
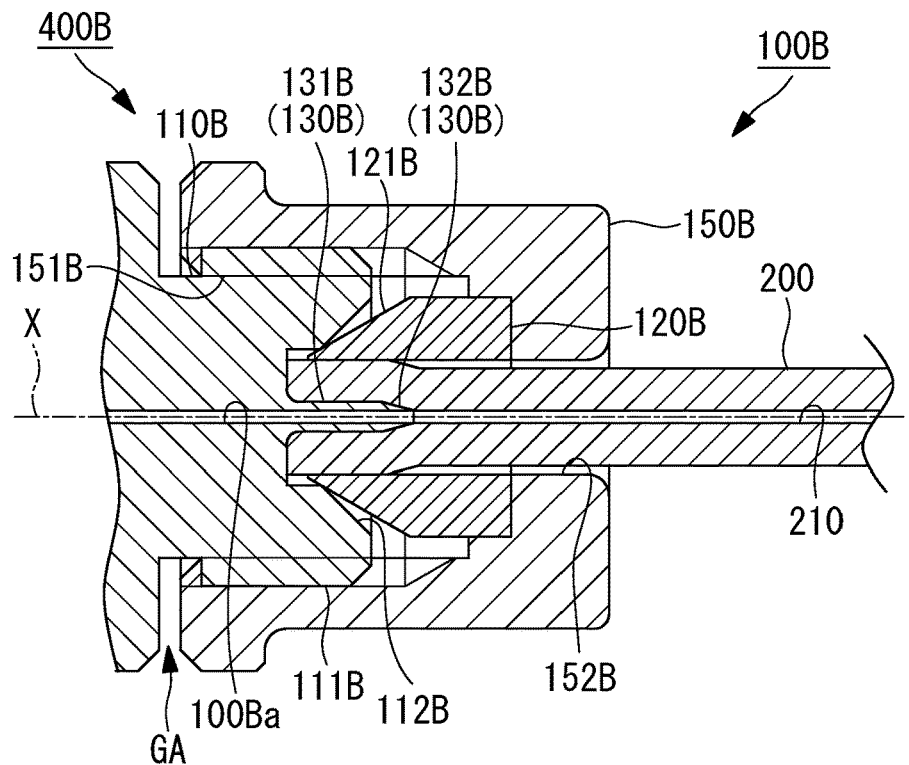
FIG. 11 is a longitudinal cross-sectional view showing the joint unit according to the third embodiment of the present disclosure, and shows a state where the insertion of the resin-made tube is completed.
Figure 12:
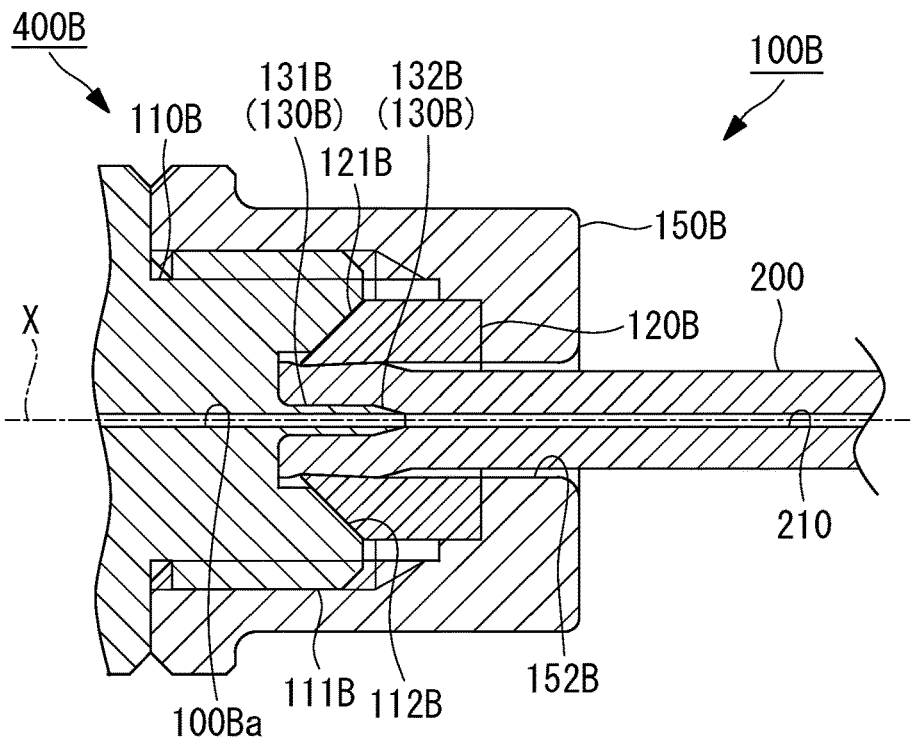
FIG. 12 is a longitudinal cross-sectional view showing the joint unit according to the third embodiment of the present disclosure, and shows a state where fastening of the attaching nut is completed.

FIG. 9 to FIG. 12 are longitudinal cross-sectional views showing the joint unit 400B according to the present embodiment. FIG. 9 shows a state where the main body 110B, the ferrule 120B and an attaching nut 150B are disassembled. FIG. 10 shows a state prior to insertion of a resin-made tube 200. FIG. 11 shows a state where the insertion of the resin-made tube 200 is completed. FIG. 12 shows a state where fastening of the attaching nut 150B is completed.

Note that FIG. 9 shows a structure of one end side (a right side of FIG. 9) of the joint unit 400B of the present embodiment, and omits a structure of the other end side (a left side of FIG. 9) of the joint unit 400B of the present embodiment. The structure of the other end side of the joint unit 400B is considered to be similar to the structure of the left side of FIG. 1 of the first embodiment, and is omitted from the following description.

As shown in FIG. 9, a joint structure 100B of the joint unit 400B of the present embodiment comprises the main body 110B, the ferrule (a tubular part) 120B, the protrusion 130B, and the attaching nut 150B.

The main body 110B is formed integrally with the protrusion 130B, and in the main body, a coupling channel 100Ba is formed. An internal thread 111B is formed in an outer peripheral surface of the main body 110B. In the main body 110B, a taper part 112B having an inner diameter that gradually increases toward a tip side is formed on an outer peripheral side of the protrusion 130B.

The protrusion 130B is formed in a shaft shape to protrude from the main body 110B along an axis X to a resin-made tube 200 side. As shown in FIG. 9, the protrusion 130B includes a base 131B, and a tip portion 132B having an outer diameter that gradually decreases toward a tip.

The ferrule 120B is a member made of a resin (e.g., PTFE) and formed in a cylindrical shape to be inserted between an outer peripheral surface of the resin-made tube 200 and the taper part 112B of the main body 110B. As shown in FIG. 9, in an end of the ferrule 120B on a main body 110B side, a tapered tip portion 121B having an outer diameter that gradually decreases toward the tip is formed.

The attaching nut 150B is a member detachably attached to the internal thread 111B of the main body 110B, formed in a tubular shape along the axis X, and has an inner peripheral surface formed with an external thread 151B. An operator engages the external thread 151B with the internal thread 111B while rotating the attaching nut 150B about the axis X, to attach the attaching nut 150B to the main body 110B. The attaching nut 150B is formed with a through hole 152B through which the resin-made tube 200 is passed.

Next, description will be made as to an assembly method of the joint unit 400B of the present embodiment with reference to the drawings. The assembly method of the joint unit 400B of the present embodiment includes attaching an end of the resin-made tube 200 to the one end side (the right side of FIG. 9) of the joint structure 100B, and attaching an end of another resin-made tube to the other end side (the left side of FIG. 9). Hereinafter, description will be made as to a method of attaching the end of the resin-made tube 200 to the one end side (the right side of FIG. 9) of the joint structure 100B.

Prior to the attaching of the resin-made tube 200, the operator engages the external thread 151B with the internal thread 111B while rotating the attaching nut 150B about the axis X, to attach the attaching nut 150B to the main body 110B. Consequently, as shown in FIG. 10, the ferrule 120B is interposed between the attaching nut 150B and the main body 110B.

In the state shown in FIG. 10, the fastening of the attaching nut 150B to the main body 110B is not completed, and a gap GA is provided along the axis X between the attaching nut 150B and the main body 110B. Furthermore, in the state shown in FIG. 10, an inner diameter Dfi of the ferrule 120B is larger than an outer diameter Dto of the resin-made tube 200. Consequently, the operator can insert the resin-made tube 200 on an inner peripheral side of the ferrule 120B.

Next, the operator grasps both the resin-made tube 200 and the joint structure 100B, and inserts the end of the resin-made tube 200 in the ferrule 120B of the joint structure 100B on the inner peripheral side. In a state where the end of the resin-made tube 200 is in contact with the tip portion 132B of the protrusion 130B of the joint structure 100B, an outer peripheral surface of the resin-made tube 200 is held by an inner peripheral surface of the ferrule 120B. That is, even if the operator moves the resin-made tube 200 in a direction orthogonal to the axis X, the outer peripheral surface of the resin-made tube 200 comes in contact with the inner peripheral surface of the ferrule 120B, to maintain a state where the tube is disposed on the inner peripheral side of the ferrule 120B.

Next, the operator pushes the end of the resin-made tube 200 toward a space between the ferrule 120B and the protrusion 130B in the state where both the resin-made tube 200 and the joint structure 100B are grasped. As shown in FIG. 11, when pushing the end of the resin-made tube 200 inward, the base 131B and the tip portion 132B of the protrusion 130B of the joint structure 100B are inserted in a liquid transferring channel 210 of the resin-made tube 200 (an insertion step).

In a case where the end of the resin-made tube 200 is pushed toward the protrusion 130B, if the ferrule 120B is not present, a position of the tip portion 132B of the protrusion 130B may be shifted from a position of the liquid transferring channel 210 of the resin-made tube 200 by the operator's operation of pushing the resin-made tube 200 inward. In the present embodiment, since the outer peripheral surface of the resin-made tube 200 is held by the inner peripheral surface of the ferrule 120B, the position of the tip portion 132B of the protrusion 130B is prevented from being shifted from the position of the liquid transferring channel 210 of the resin-made tube 200.

Next, the operator rotates the attaching nut 150B about the axis X, to narrow the gap GA provided between the attaching nut 150B and the main body 110B. As the gap GA narrows, an inner diameter of the tip portion 121B of the ferrule 120B in contact with the taper part 112B of the main body 110B decreases. Consequently, the end of the resin-made tube 200 is interposed between the tip portion 121B of the ferrule 120B and the protrusion 130B. If the gap GA provided between the attaching nut 150B and the main body 110B is eliminated, the attaching nut 150B comes in contact with the main body 110B, and the fastening of the attaching nut 150B to the main body 110B is completed.

According to the joint unit 400B of the present embodiment described above, the operator can easily perform an operation of inserting the protrusion 130B in the liquid transferring channel 210 without visually recognizing the liquid transferring channel 210 formed in the resin-made tube 200. Furthermore, without using any adhesive, the resin-made tube 200 can be held by the ferrule 120B so that the resin-made tube 200 does not fall out of the protrusion 130B.

Furthermore, according to the joint unit 400B of the present embodiment, when removing the resin-made tube 200, the operator rotates the attaching nut 150B about the axis X in a direction opposite to a direction during the fastening, to widen the gap GA provided between the attaching nut 150B and the main body 110B. As the gap GA widens, the inner diameter of the tip portion 121B of the ferrule 120B in contact with the taper part 112B of the main body 110B increases.

Consequently, the state where the end of the resin-made tube 200 is interposed between the tip portion 121B of the ferrule 120B and the protrusion 130B is canceled. Upon the cancelation of the state where the end of the resin-made tube is interposed between the tip portion 121B of the ferrule 120B and the protrusion 130B, the operator pulls out the resin-made tube 200 along the axis X, so that the resin-made tube 200 can be removed from the joint unit 400B.

Another Embodiment

The joint unit of the present embodiment is suitable for use in a tube pump that allows a liquid in a resin-made tube to flow while crushing the resin-made tube, but may have another aspect. For example, it may be used for another use application other than the tube pump. Alternatively, the joint unit may be used simply to couple two channels formed of resin-made tubes, respectively.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A joint unit including a resin-made tube in which a liquid transferring channel extending along an axis is formed and a cross section orthogonal to the axis is round and a joint structure attached to an end of the resin-made tube, the joint structure comprising:
   a main body;
   a tubular part that is formed in a tubular shape integrally protrudes from and is formed unitary with the main body along the axis and has an inner diameter with an inner peripheral surface that holds an outer peripheral surface of the resin-made tube; and
   a protrusion that is formed in a shaft shape integrally protrudes from and is formed unitary with the main body along the axis and forms, between the protrusion and the tubular part, an insertion groove in which the resin-made tube is inserted, with the protrusion also being inserted into the liquid transferring channel of the resin-made tube, the main body, the tubular part and the protrusion being a unitary one piece structure, wherein
   the main body and the protrusion are formed with a coupling channel extending along the axis and coupling the liquid transferring channel and another channel,
   a tip of the protrusion is disposed at a position closer to the main body than a tip of the tubular part,
   the protrusion includes a constant diameter shaft portion extending for at least a majority of a length of the insertion groove, and a tip portion having an outer diameter that gradually decreases toward the tip of the protrusion, and
   the tubular part has a constant inner diameter in a region from a base of the protrusion to the tip of the protrusion along the axis and has a shape in which an inner diameter expands at the tip of the tubular part in a region from the tip of the protrusion to the tip of the tubular part along the axis,
   wherein
   an outer diameter of the protrusion is larger than an inner diameter of the liquid transferring channel, an outer diameter of the resin-made tube is smaller than an inner diameter of the tubular part, and the tubular part is disposed on an outer peripheral side of the protrusion in a non-inserted state when the protrusion is not inserted in the liquid transferring channel of the resin-made tube, wherein insertion of the protrusion into the liquid transferring channel of the resin-made tube expands size of the outer peripheral surface of the resin-made tube over the constant diameter shaft portion to form an expanded cylindrical surface extending for at least a majority of the length of the insertion groove to be securely held by the inner peripheral surface of the tubular part disposed on an outer peripheral side of the protrusion.

2. The joint unit according to claim 1, wherein a length of the protrusion along the axis is three times or more as large as an outer diameter of the protrusion.

3. The joint unit according to claim 1, wherein a length from the tip of the protrusion to the tip of the tubular part is 0.2 times or more as large as an inner diameter of the tubular part.

4. The joint unit according to claim 1, wherein
the outer diameter of the resin-made tube is three times or more and 15 times or less as large as an inner diameter of the resin-made tube,
the inner diameter of the resin-made tube is 0.1 mm or more and 1.0 mm or less, and
a thickness of the resin-made tube is equal to a distance between the inner peripheral surface of the tubular part and an outer peripheral surface of the protrusion, or slightly smaller than the distance between the inner peripheral surface of the tubular part and the outer peripheral surface of the protrusion.

5. The joint unit according to claim 1, wherein the main body is formed of a resin material integrally with the tubular part and the protrusion.

6. The joint unit according to claim 1, wherein a length of the protrusion along the axis is longer than a length from the tip of the protrusion to the tip of the tubular part along the axis.

7. An assembly method of a joint unit comprising a resin-made tube in which a liquid transferring channel extending along an axis is formed and a cross section orthogonal to the axis is round, and a joint structure attached to an end of the resin-made tube, the joint structure comprising:
a main body,
a tubular part that is formed in a tubular shape integrally protrudes from and is formed unitary with the main body along the axis and has an inner diameter with an inner peripheral surface that holds an outer peripheral surface of the resin-made tube, and
a protrusion that is formed in a shaft shape integrally protrudes from and is formed unitary with the main body along the axis and forms, between the protrusion and the tubular part, an insertion groove in which the resin-made tube is inserted, with the protrusion also being inserted into the liquid transferring channel of the resin-made tube, the main body, the tubular part and the protrusion being a unitary one piece structure, wherein
an outer diameter of the protrusion is larger than an inner diameter of the liquid transferring channel,
an outer diameter of the resin-made tube is smaller than an inner diameter of the tubular part, and the tubular part is disposed on an outer peripheral side of the protrusion in a non-inserted state when the protrusion is not inserted in the liquid transferring channel of the resin-made tube,
a tip of the protrusion is disposed at a position closer to the main body than a tip of the tubular part,
the protrusion includes a constant diameter shaft portion extending for at least a majority of a length of the insertion groove, and a tip portion having an outer diameter that gradually decreases toward the tip of the protrusion, and
the tubular part has a constant inner diameter in a region from a base of the protrusion to the tip of the protrusion along the axis and has a shape in which an inner diameter expands at the tip of the tubular part in a region from the tip of the protrusion to the tip of the tubular part along the axis,
the method comprising:
an applying step of applying an adhesive to at least one of an outer peripheral surface of the end of the resin-made tube and an inner peripheral surface of the tubular part,
an insertion step of inserting the resin-made tube into the tubular part and the protrusion in the liquid transferring channel of the resin-made tube, wherein insertion of the protrusion into the liquid transferring channel of the resin-made tube expands size of the outer peripheral surface of the resin-made tube over the constant diameter shaft portion to form an expanded cylindrical surface extending for at least a majority of the length of the insertion groove to be securely held by the inner peripheral surface of the tubular part disposed on an outer peripheral side of the protrusion, and
a bonding step of curing the adhesive applied in the applying step, and bonding the outer peripheral surface of the resin-made tube in which the protrusion is inserted in the insertion step and the inner peripheral surface of the tubular part.

8. The assembly method according to claim 7, wherein
the outer diameter of the resin-made tube is three times or more and 15 times or less as large as an inner diameter of the resin-made tube,
the inner diameter of the resin-made tube is 0.1 mm or more and
a thickness of the resin-made tube is equal to a distance between the inner peripheral surface of the tubular part and an outer peripheral surface of the protrusion, or slightly smaller than the distance between the inner peripheral surface of the tubular part and the outer peripheral surface of the protrusion.

9. The assembly method according to claim 7, wherein the main body is formed of a resin material integrally with the tubular part and the protrusion.

10. The assembly method according to claim 7, wherein a length of the protrusion along the axis is longer than a length from the tip of the protrusion to the tip of the tubular part along the axis.

* * * * *